(12) United States Patent
Ohara et al.

(10) Patent No.: US 10,033,033 B2
(45) Date of Patent: Jul. 24, 2018

(54) NON-AQUEOUS ELECTROLYTE SECONDARY BATTERY

(71) Applicant: NISSAN MOTOR CO., LTD., Yokohama-shi, Kanagawa (JP)

(72) Inventors: Kenji Ohara, Yokohama (JP); Yoshiaki Nitta, Yokohama (JP); Gentaro Kano, Yokohama (JP); Tomoya Kubota, Yokohama (JP); Masanori Aoyagi, Ebina (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 308 days.

(21) Appl. No.: 14/786,787

(22) PCT Filed: Apr. 23, 2014

(86) PCT No.: PCT/JP2014/061482
§ 371 (c)(1),
(2) Date: Oct. 23, 2015

(87) PCT Pub. No.: WO2014/175354
PCT Pub. Date: Oct. 30, 2014

(65) Prior Publication Data
US 2016/0190549 A1 Jun. 30, 2016

(30) Foreign Application Priority Data
Apr. 26, 2013 (JP) ................. 2013-094518

(51) Int. Cl.
*H01M 4/36* (2006.01)
*H01M 4/131* (2010.01)
(Continued)

(52) U.S. Cl.
CPC ......... *H01M 4/364* (2013.01); *H01M 2/0285* (2013.01); *H01M 4/131* (2013.01);
(Continued)

(58) Field of Classification Search
CPC ...... H01M 4/364; H01M 4/131; H01M 4/505; H01M 4/525
See application file for complete search history.

(56) References Cited

U.S. PATENT DOCUMENTS

2004/0106038 A1* 6/2004 Shimamura ........... H01M 2/021
429/152
2004/0142234 A1 7/2004 Nakanishi et al.
(Continued)

FOREIGN PATENT DOCUMENTS

EP 1174937 A1 1/2002
EP 2975676 A1 1/2016
(Continued)

*Primary Examiner* — Ula Corinna Ruddock
*Assistant Examiner* — Frank A Chernow
(74) *Attorney, Agent, or Firm* — Young Basile Hanlon & MacFarlane, P.C.

(57) ABSTRACT

A non-aqueous electrolyte secondary battery has the internal resistance of 10 mΩ/Ah or less (SOC of 50%) and has a power generating element containing the following: a positive electrode obtained by forming, on the surface of a positive electrode current collector, a positive electrode active substance layer containing a positive electrode active substance; a negative electrode obtained by forming, on the surface of a negative electrode current collector, a negative electrode active substance layer containing a negative electrode active substance; and a separator. The positive electrode active substance is made to contain a spinel type lithium manganese composite oxide and a lithium nickel-based composite oxide, and the mixing ratio of the lithium nickel-based composite oxide is 50 to 70% by weight relative to the total 100% by weight of the spinel type lithium manganese composite oxide and the lithium nickel-based composite oxide.

8 Claims, 3 Drawing Sheets

(51) Int. Cl.
  *H01M 4/505* (2010.01)
  *H01M 4/525* (2010.01)
  *H01M 10/052* (2010.01)
  *H01M 2/02* (2006.01)
  H01M 2/16 (2006.01)
  H01M 4/02 (2006.01)

(52) U.S. Cl.
  CPC ........... *H01M 4/505* (2013.01); *H01M 4/525* (2013.01); *H01M 10/052* (2013.01); *H01M 2/0287* (2013.01); *H01M 2/1686* (2013.01); *H01M 2004/021* (2013.01); *Y02T 10/7011* (2013.01)

(56) References Cited

U.S. PATENT DOCUMENTS

| | | |
|---|---|---|
| 2005/0191553 A1 | 9/2005 | Fujihara et al. |
| 2006/0204845 A1 | 9/2006 | Chang et al. |
| 2007/0284159 A1 | 12/2007 | Takami et al. |
| 2009/0092900 A1 | 4/2009 | Obana et al. |
| 2011/0039159 A1 | 2/2011 | Ryu et al. |
| 2012/0288742 A1 | 11/2012 | Tanaka et al. |
| 2014/0058598 A1 | 2/2014 | Matsui et al. |

FOREIGN PATENT DOCUMENTS

| | | |
|---|---|---|
| EP | 2975677 A1 | 1/2016 |
| EP | 2975680 A1 | 1/2016 |
| JP | 2006-196250 A | 7/2006 |
| JP | 2006-278322 A | 10/2006 |
| JP | 2007-335157 A | 12/2007 |
| JP | 2008-532221 A | 8/2008 |
| JP | 2009-087889 A | 4/2009 |
| JP | 2011-018547 A | 1/2011 |
| JP | 2012-182025 A | 9/2012 |
| JP | 2014-060143 A | 4/2014 |
| KR | 20040032780 A | 4/2004 |
| KR | 20130026373 A | 3/2013 |
| WO | 2012-036127 A1 | 3/2012 |

\* cited by examiner

NON-AQUEOUS ELECTROLYTE SECONDARY BATTERY

CROSS REFERENCE TO RELATED APPLICATION

The entire contents of the Japanese Patent Application No. 2013-094518 (filed on Apr. 26, 2013) in which the priority right of the present patent application is claimed is herein incorporated by reference.

TECHNICAL FIELD

The present invention relates to a non-aqueous electrolyte secondary battery.

BACKGROUND

Currently, a non-aqueous electrolyte secondary battery including a lithium ion secondary battery, which is used for a mobile device such as a mobile phone, is available as a commercial product. The non-aqueous electrolyte secondary battery generally has a constitution that a positive electrode having a positive electrode active substance or the like coated on a current collector and a negative electrode having a negative electrode active substance or the like coated on a current collector are connected to each other via an electrolyte layer in which a non-aqueous electrolyte solution or a non-aqueous electrolyte gel is maintained within a separator. According to absorption and desorption of ions such as lithium ions on an electrode active substance, charging and discharging reactions of a battery occur.

In recent years, it is desired to reduce the amount of carbon dioxide in order to cope with the global warming. As such, a non-aqueous electrolyte secondary battery having small environmental burden has been used not only for a mobile device or the like but also for a power source device of an electric vehicle such as a hybrid vehicle (HEV), an electric vehicle (EV), and a fuel cell vehicle.

As a positive electrode active substance used for a non-aqueous electrolyte secondary battery, a lithium manganese composite oxide ($LiMn_2O_4$) is known. $LiMn_2O_4$ has a spinel structure and, by having composition with $\lambda$-$MnO_2$, it is known to function as a positive electrode material at 4 V level. Since the lithium manganese composite oxide with a spinel structure has a three dimensional host structure that is different from a layer structure of $LiCoO_2$ or the like, most of the theoretical capacity can be used, and thus it is expected to have excellent cycle characteristics. Furthermore, compared to $LiCoO_2$ or the like containing cobalt, that is, a rare metal, it also has an advantage of relatively low cost.

Meanwhile, the non-aqueous electrolyte secondary battery which is hopefully to be applied for an electrically driven vehicle is required to have, in addition to the high capacity as a basic requirement, many excellent characteristics such as high output characteristics. To deal with these demands, various techniques for improving battery characteristics by using two or more positive electrode active substances in combination have been suggested. For example, in JP 2011-18547 A, as a technique for enabling prevention of at least one of over discharge and over charge while having stable output characteristics, combined use of a first positive electrode active substance ($LiMnPO_4$) which is responsible, as a main component of a positive electrode active substance, for performing two-phase coexistence type charge and discharge, and a second positive electrode active substance ($LiFePO_4$) which is also responsible, as a minor component, for performing two-phase coexistence type charge and discharge is disclosed.

Herein, an electrically driven vehicle such as an electric vehicle has a function of displaying a remaining capacity of a secondary battery to be installed or a remaining cruising distance and providing the information to a driver. Thus, based on the displayed information such as a remaining battery capacity or a cruising distance, the driver can determine the possibility for continuous driving to a destination or the necessity for charging, and if necessary, he can take countermeasures such as driving according to a driving mode that puts great value on a cruising distance, heading to a charging stand, or the like.

When display of a remaining battery capacity is performed, the cell voltage value of a battery is determined by real time detection. Subsequently, a corresponding DOD value to the detected cell voltage value is determined in view of a discharge curve, which is obtained (in advance) by plotting cell voltage against DOD (depth of discharge [%]). Then, from the obtained result, the remaining battery capacity can be calculated as follows:

$$\text{Remaining battery capacity} = (100 - \text{DOD})[\%].$$

SUMMARY

The reliability of the remaining battery capacity displayed by the aforementioned method depends on the reliability of cell voltage to be detected. A secondary battery for an electrically driven vehicle may be required to have temporary discharge at high output (having high current within a short time) due to a large fluctuation in load. However, when such high output is exhibited, there is a phenomenon of having a temporary drop in cell voltage. Although such temporary drop in cell voltage diminishes over time and it eventually recovers to the value before drop, it becomes a problem for a case in which display of the remaining battery capacity is performed by detecting the cell voltage value of a battery based on real time detection. Namely, when the remaining battery capacity is calculated based on cell voltage which has been temporarily dropped in accordance with exhibition of high output (high current), a value lower than the actual remaining battery capacity is calculated. In addition, in a discharge curve of a spinel type lithium manganese composite oxide, a plateau area showing a gradual decrease in voltage which occurs according to progress of DOD exists in the region of DOD of 20 to 80%, which corresponds to a common application range of a battery installed in a vehicle. For such reasons, it is found that the non-aqueous electrolyte secondary battery in which the spinel type lithium manganese composite oxide is used as a positive electrode active substance has a problem that a significant error in remaining capacity display that is caused by temporary drop in cell voltage is actualized.

Thus, the inventors of the present invention conducted intensive studies. As a result, they found that the aforementioned problem can be solved by setting the mixing ratio of a lithium nickel-based composite oxide to be in a specific range in a positive electrode active substance containing the spinel type lithium manganese composite oxide and the lithium nickel-based composite oxide. The present invention is completed accordingly.

Namely, according to one embodiment of the present invention, a non-aqueous electrolyte secondary battery having a power generating element containing a positive electrode obtained by forming, on the surface of a positive electrode current collector, a positive electrode active substance layer containing a positive electrode active substance, a negative electrode obtained by forming, on the surface of a negative electrode current collector, a negative electrode active substance layer containing a negative electrode active substance, and a separator, and having the internal resistance of 10 mΩ/Ah or less (SOC of 50%) is provided. Furthermore, the non-aqueous electrolyte secondary battery is characterized in that the positive electrode active substance contains the spinel type lithium manganese composite oxide and the lithium nickel-based composite oxide and the mixing ratio of the lithium nickel-based composite oxide is 50 to 70% by weight relative to the total 100% by weight of the spinel type lithium manganese composite oxide and the lithium nickel-based composite oxide.

DETAILED DESCRIPTION OF THE EMBODIMENTS

Figure 1:
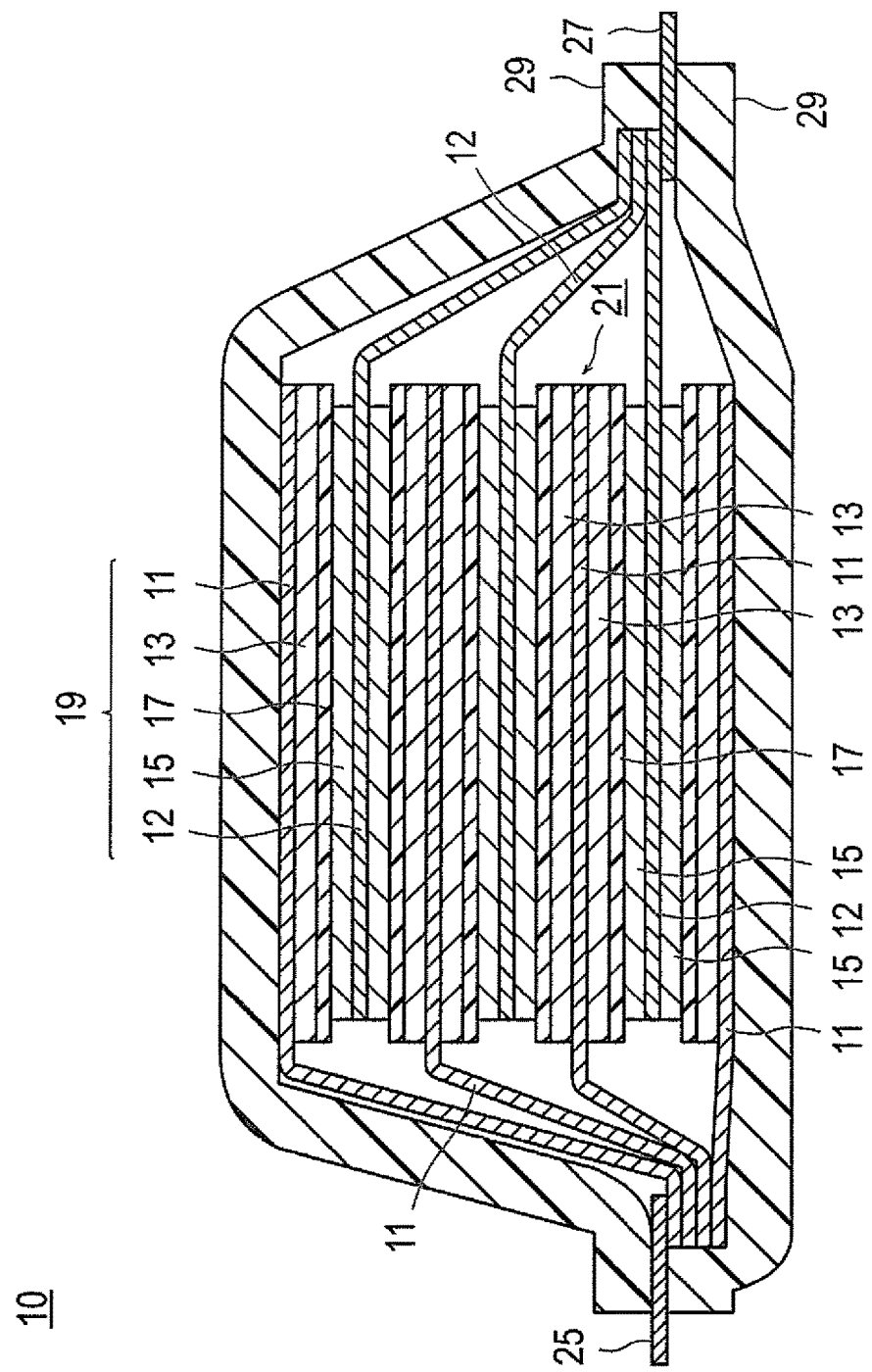
FIG. 1 is a cross-sectional view schematically illustrating the basic constitution of a non-aqueous electrolyte lithium ion secondary battery of a flat type (stack type) as one embodiment of the non-aqueous electrolyte lithium ion secondary battery, in which the non-aqueous electrolyte lithium ion secondary battery is not a bipolar type.

According to one embodiment of the present invention, provided is a non-aqueous electrolyte secondary battery having a power generating element containing a positive electrode obtained by forming, on the surface of a positive electrode current collector, a positive electrode active substance layer containing a positive electrode active substance, a negative electrode obtained by forming, on the surface of a negative electrode current collector, a negative electrode active substance layer containing a negative electrode active substance, and a separator, in which the positive electrode active substance contains the spinel type lithium manganese composite oxide and a lithium nickel-based composite oxide, the mixing ratio of the lithium nickel-based composite oxide is 50 to 70% by weight relative to the total 100% by weight of the spinel type lithium manganese composite oxide and the lithium nickel-based composite oxide, and the internal resistance is 10 mΩ/Ah or less (SOC of 50%). According to the non-aqueous electrolyte secondary battery of the present invention, by mixing a predetermined amount of the lithium nickel-based composite oxide, it is possible to increase the absolute value of slope of a plateau area in a region with DOD of 20 to 80% in the discharge curve of the spinel type lithium manganese composite oxide. As a result, for a non-aqueous electrolyte secondary battery in which the spinel type lithium manganese composite oxide is used as a positive electrode active substance, an error in remaining capacity display can be reduced even when there is a temporary drop in cell voltage due to high output load or the like during use of a battery.

Hereinbelow, embodiments of the present invention are described with reference to the attached drawings. Meanwhile, the same elements are given with the same symbols for the descriptions of the drawings, and overlapped descriptions are omitted. Further, note that dimensional ratios in the drawings are exaggerated for the sake of description, and they may be different from actual ratios in some cases.

[Non-Aqueous Electrolyte Secondary Battery]

FIG. 1 is a cross-sectional view schematically illustrating the brief constitution of a stack type battery as one embodiment of the battery of the present invention. Meanwhile, detailed descriptions are given in the present specification for, as an example, a lithium ion secondary battery of a flat type (stack type) which is not a bipolar type illustrated in FIG. 1. However, it is evident that the technical scope of the present invention is not limited thereto.

First, the overall structure of the non-aqueous electrolyte secondary battery of the present invention is described by means of drawings.

[Overall Structure of Battery]

FIG. 1 is a cross-sectional view schematically illustrating the basic constitution of a non-aqueous electrolyte lithium ion secondary battery of flat type (stack type) which is not a bipolar type (hereinbelow, it is also simply referred to as a "stack type battery"). As illustrated in FIG. 1, a stack type battery 10 according to this embodiment has a structure in which the power generating element 21 with a substantially rectangular shape, in which a charge and discharge reaction actually occurs, is sealed inside of a battery outer casing material 29 as an outer casing body. Herein, the power generating element 21 has a constitution in which a positive electrode, a separator 17, and a negative electrode are stacked. Meanwhile, the separator 17 has a non-aqueous electrolyte (for example, liquid electrolyte) therein. The positive electrode has a structure in which the positive electrode active substance layer 15 is disposed on both surfaces of the positive electrode current collector 12. The negative electrode has a structure in which the negative electrode active substance layer 13 is disposed on both surfaces of the negative electrode current collector 11. Specifically, one positive electrode active substance layer 15 and the neighboring negative electrode active substance layer 13 are disposed to face each other via the separator 17, and a negative electrode, an electrolyte layer and a positive electrode are stacked in this order. Accordingly, the neighboring positive electrode, electrolyte layer and negative electrode form one single battery layer 19. As such, it can also be said that, as plural single barrier layers 19 are stacked, the stack type battery 10 illustrated in FIG. 1 has a constitution in which electrically parallel connection is made among them.

Meanwhile, on the outermost layer positive electrode current collector which is present on both outermost layers of the power generating element 21, the negative electrode active substance layer 13 is disposed only on a single surface. However, an active substance layer may be formed on both surfaces. Namely, not only a current collector exclusive for an outermost layer in which an active substance layer is formed only on a single surface can be prepared but also a current collector having an active substance layer on both surfaces can be directly used as a current collector of an outermost layer. Furthermore, by reversing the arrangement of the positive electrode and negative electrode of FIG. 1, it is also possible that the outer most layer positive electrode current collector is disposed on both outermost layers of the power generating element 21 and a positive electrode active substance layer is disposed only on a single surface of the outermost layer positive electrode current collector.

The positive electrode current collector 12 and negative electrode current collector 11 have a structure in which each of the positive electrode current collecting plate (tab) 27 and negative electrode current collecting plate (tab) 25, which conductively communicate with each electrode (positive electrode and negative electrode), is attached and inserted to a terminal of the battery outer casing material 29 so as to be led to the outside of the battery outer casing material 29. If necessary, each of the positive electrode current collecting plate 27 and negative electrode current collecting plate 25 can be attached, via a positive electrode lead and negative electrode lead (not illustrated), to the positive electrode current collector 12 and negative electrode current collector 11 of each electrode by ultrasonic welding, resistance welding or the like.

Meanwhile, although a stack type battery of flat type (stack type) which is not a bipolar type is illustrated in FIG. 1, it can also be a bipolar type battery containing a bipolar type electrode which has a positive electrode active substance layer electrically bound to one surface of a current collector and a negative electrode active substance layer electrically bound to the opposite surface of a current collector. In that case, one current collector plays both roles of a positive electrode current collector and a negative electrode current collector.

Hereinbelow, each member constituting one embodiment of the non-aqueous electrolyte secondary battery of the present invention is described.

[Positive Electrode]

The positive electrode has a positive electrode current collector and a positive electrode active substance layer that is formed on a surface of the positive electrode current collector.

(Positive Electrode Current Collector)

The material for constituting a positive electrode current collector is not particularly limited, but a metal is preferably used. Specific examples of the metal include aluminum, nickel, iron, stainless, titan, copper, and other alloys. In addition to them, a clad material of a nickel and aluminum, a clad material of copper and aluminum, or a plating material of a combination of those metals can be preferably used. It can also be a foil obtained by coating aluminum on a metal surface. Among them, from the viewpoint of electron conductivity or potential for operating a battery, aluminum, stainless, and copper are preferable.

The size of the current collector is determined based on use of a battery. When it is used for a large-size battery which requires high energy density, for example, a current collector with large area is used. Thickness of the current collector is not particularly limited, either. Thickness of the current collector is generally 1 to 100 μm or so.

(Positive electrode active substance layer)

The positive electrode active substance layer contains a positive electrode active substance. According to this embodiment, the positive electrode active substance essentially contains spinel type lithium manganese composite oxide and lithium nickel-based composite oxide. Meanwhile, the ratio of the total amount of spinel type lithium manganese composite oxide and lithium nickel-based composite oxide relative to the whole amount of 100% by weight of the positive electrode active substance contained in the positive electrode active substance layer is preferably 50% by weight or more, more preferably 70% by weight or more, even more preferably 85% by weight or more, still even more preferably 90% by weight or more, particularly preferably 95% by weight or more, and most preferably 100% by weight.

The average particle diameter of the positive electrode active substance is, although not particularly limited, preferably 6 to 11 μm, and more preferably 7 to 10 μm in terms of secondary particle diameter, from the viewpoint of having high output. Furthermore, the average particle diameter of primary particle is 0.4 to 0.65 μm, and more preferably 0.45 to 0.55 μm. Meanwhile, note that "particle diameter" described in the present specification means a maximum distance L among distances, each of which is a distance between arbitrary two points on outlines of a particle. Furthermore, as for the value of "average particle diameter" described herein, employed is a value which is calculated as a mean value of particle diameters of particles observed in several to several tens of visual fields by using an observing means such as a scanning electron microscope (SEM) or a transmission electron microscope (TEM).

Spinel Type Lithium Manganese Composite Oxide

The spinel type lithium manganese composite oxide typically has a composition of $LiMn_2O_4$, and it is a composite oxide which has a spinel structure and essentially contains lithium and manganese. As for the specific constitution or manufacturing method thereof, reference can be suitably made to conventionally known knowledge that is described in JP 2000-77071 A or the like.

Lithium Nickel-Based Composite Oxide

The lithium nickel-based composite oxide is not specifically limited in terms of the composition as long as it is a composite oxide containing lithium and nickel. Representative examples of the composite oxide containing lithium and nickel include a lithium nickel composite oxide ($LiNiO_2$). However, a composite oxide in which part of the nickel atoms of the lithium nickel composite oxide is replaced with another metal atom is more preferable. As a preferable example, a lithium-nickel-manganese-cobalt composite oxide (hereinbelow, also simply referred to as "NMC composite oxide") has a layered crystal structure in which a lithium atom layer and a transition metal (Mn, Ni, and Co are arranged with regularity) atom layer are alternately stacked via an oxygen atom layer, one Li atom is included per atom of transition metal M and extractable Li amount is twice the amount of spinel type lithium manganese composite oxide, that is, as the supply power is two times higher, it can have high capacity. In addition, as having higher heat stability compared to $LiNiO_2$, it is particularly advantageous among the lithium nickel-based composite oxides that are used as a positive electrode active substance.

As described herein, the NMC composite oxide includes a composite oxide in which part of transition metal elements are replaced with another metal element. In that case, examples of another element include Ti, Zr, Nb, W, P, Al, Mg, V, Ca, Sr, Cr, Fe, B, Ga, In, Si, Mo, Y, Sn, V, Cu, Ag, and Zn. Preferably, it is Ti, Zr, Nb, W, P, Al, Mg, V, Ca, Sr, or Cr. More preferably, it is Ti, Zr, P, Al, Mg, or Cr. From the viewpoint of improving the cycle characteristics, it is even more preferably Ti, Zr, Al, Mg, or Cr.

By having high theoretical discharge capacity, the NMC composite oxide preferably has a composition represented by General Formula (1): $Li_aNi_bMn_cCo_dM_xO_2$ (with the proviso that, in the formula, a, b, c, d, and x satisfy $0.9 \leq a \leq 1.2$, $0 < b < 1$, $0 < c \leq 0.5$, $0 < d \leq 0.5$, $0 \leq x \leq 0.3$, and $b+c+d=1$. M represents at least one element selected from Ti, Zr, Nb, W, P, Al, Mg, V, Ca, Sr, and Cr). Herein, a represents the atomic ratio of Li, b represents the atomic ratio of Ni, c represents the atomic ratio of Mn, d represents the atomic ratio of Co, and x represents the atomic ratio of M. From the viewpoint of the cycle characteristics, it is preferable that $0.4 \le b \le 0.6$ in the General Formula (1). Meanwhile, composition of each element can be measured, for example, by induction coupled plasma (ICP) spectroscopy.

In general, from the viewpoint of improving purity and improving electron conductivity of a material, nickel (Ni), cobalt (Co) and manganese (Mn) are known to contribute to capacity and output characteristics. Ti or the like replaces part of transition metal in a crystal lattice. From the viewpoint of the cycle characteristics, it is preferable that part of transition element are replaced by another metal element, and it is preferable that $0<x \le 0.3$ is satisfied in the General Formula (1), in particular. It is believed that the crystal structure is stabilized by dissolving at least one selected from the group consisting of Ti, Zr, Nb, W, P, Al, Mg, V, Ca, Sr and Cr so that decrease in capacity of a battery can be prevented even after repeated charge and discharge, and thus, excellent cycle characteristics can be achieved.

Furthermore, the positive electrode active substance of the composite oxide in which b, c and d of General Formula (1) satisfy $0.44 \le b \le 0.51$, $0.27 \le c \le 0.31$, and $0.19 \le d \le 0.26$ is preferable from the viewpoint of enhancing the balance between capacity and service life characteristics.

The lithium nickel-based composite oxide such as the NMC composite oxide can be produced by selecting various known methods such as a co-precipitation method and a spray drying method. From the viewpoint of having easy production of the composite oxide according to this embodiment, a co-precipitation method is preferably used. Specifically, with regard to a method for synthesizing the NMC composite oxide, production can be made by, for example, a method described in JP 2011-105588 A in which a nickel-cobalt-manganese composite oxide is produced by the co-precipitation method and the nickel-cobalt-manganese composite oxide is admixed with a lithium compound followed by calcination. Specific descriptions are given hereinbelow.

Raw material compounds of a composite oxide, for example, a Ni compound, a Mn compound, or a Co compound, are dissolved in a suitable solvent such as water so as to have a desired composition of an active substance material. Examples of the Ni compound, the Mn compound and the Co compound include sulfate, nitrate, carbonate, acetate, oxalate, oxide, hydroxide, and halide of the metal element. Specific examples of the Ni compound, the Mn compound and the Co compound include nickel sulfate, cobalt sulfate, manganese sulfate, nickel acetate, cobalt acetate, and manganese acetate, but not limited thereto. During the process, if necessary, in order to have a further desired composition of an active substance, a compound containing at least one metal element such as Ti, Zr, Nb, W, P, Al, Mg, V, Ca, Sr or Cr as a metal element for replacing part of the layered lithium metal composite oxide which forms the active substance may be further incorporated.

A co-precipitation reaction can be performed by neutralization and precipitation reactions using the above raw material compounds and an alkali solution. Accordingly, metal composite hydroxide or metal composite carbonate containing the metal included in the above raw material compounds can be obtained. Examples of the alkali solution which can be used include an aqueous solution of sodium hydroxide, potassium hydroxide, sodium carbonate, or ammonia. For the neutralization reaction, it is preferable to use sodium hydroxide, sodium carbonate, or a mixture solution thereof. In addition, it is preferable to use an aqueous ammonia solution or ammonia salt for a complex reaction.

The addition amount of the alkali solution used for neutralization reaction is sufficient to have the equivalent ratio of 1.0 to components to be neutralized which are contained in the whole metal salts. However, for having pH control, it is preferably added together with an excess alkali amount.

The aqueous ammonia solution or ammonia salt used for a complex reaction is preferably added such that the ammonia concentration in the reaction solution is in a range of 0.01 to 2.00 mol/l. The pH of the reaction solution is preferably controlled in a range of 10.0 to 13.0. The reaction temperature is preferably 30° C. or higher, and more preferably 30 to 60° C.

The composite hydroxide obtained by co-precipitation reaction is then preferably filtered by suction, washed with water, and dried. Meanwhile, by controlling the conditions for performing the co-precipitation reaction (for example, stirring time and alkali concentration), particle diameter of the composite hydroxide can be controlled, and it has an influence on the average particle diameter of the secondary particles of a positive electrode active substance which is finally obtained.

Subsequently, by mixing and calcining nickel-cobalt-manganese composite hydroxide with a lithium compound, the lithium-nickel-manganese-cobalt composite oxide can be obtained. Examples of the Li compound include lithium hydroxide or a hydrate thereof, lithium peroxide, lithium nitrate and lithium carbonate.

The calcination treatment can be performed by one step, but it is preferably performed by two steps (temporary calcination and main calcination). According to two-step calcination, a composite oxide can be obtained efficiently. The conditions for temporary calcination are not particularly limited, and they may vary depending on the lithium raw material, and thus cannot be unambiguously defined. Meanwhile, the temperature increase rate is preferably 1 to 20° C./minute from room temperature. Furthermore, the atmosphere is preferably either air or oxygen atmosphere. Here, when the NMC composite oxide is synthesized by using lithium carbonate as the Li raw material, temperature for temporary calcination is preferably 500 to 900° C., more preferably 600 to 800° C., and even more preferably 650 to 750° C. Furthermore, time for temporary calcination is preferably 0.5 to 10 hours and more preferably 4 to 6 hours. Meanwhile, as for the conditions for main calcination, the temperature increase rate is preferably 1 to 20° C./minute from room temperature, although it is not particularly limited thereto. Furthermore, the atmosphere is preferably either air or oxygen atmosphere. Here, when the NMC composite oxide is synthesized by using lithium carbonate as the Li raw material, temperature for main calcination is preferably 800 to 1200° C., more preferably 850 to 1100° C., and even more preferably 900 to 1050° C. Furthermore, time for main calcination is preferably 1 to 20 hours and more preferably 8 to 12 hours.

When a tiny amount of a metal element for replacing part of the layered lithium metal composite oxide forming an active substance material is added as needed, any means such as mixing it in advance with nickel, cobalt, manganate salt, adding it simultaneously with nickel, cobalt, manganate salt, adding it to a reaction solution during the reaction, or adding it to the nickel-cobalt-manganese composite oxide with a Li compound can be employed.

The lithium nickel-based composite oxide can be produced by suitably controlling the reaction conditions such as pH of a reaction solution, reaction temperature, reaction concentration, speed for addition, and stirring time.

Figure 2A:
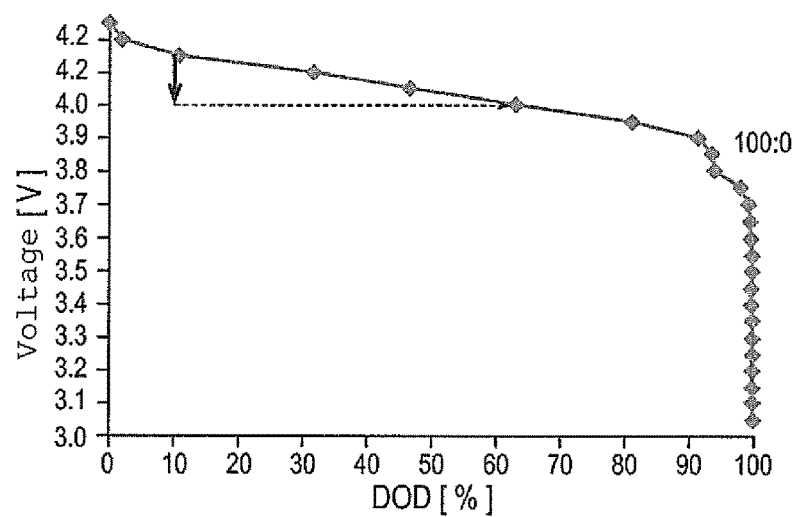
FIG. 2(A) is a graph illustrating the discharge curve of the spinel type lithium manganese composite oxide.

With regard to a non-aqueous electrolyte secondary battery in which a spinel type lithium manganese composite oxide is used as a positive electrode active substance, the inventors of the present invention intensively studied to find out a reason for having a lower remaining battery capacity, which is calculated and displayed by detecting cell voltage, than the actual value, and identified the reason as follows. Specifically, in the discharge curve of the spinel type lithium manganese composite oxide, a plateau area showing a gradual decrease in voltage which occurs according to progress of DOD exists in the region of DOD of 20 to 80%, which corresponds to a common application range of a battery installed in a vehicle (see, FIG. 2(A)). For such reasons, in a non-aqueous electrolyte secondary battery in which the spinel type lithium manganese composite oxide is used as a positive electrode active substance, when the cell voltage even temporarily drops, the DOD corresponding to the (dropped) cell voltage in the discharge curve shows a value which is much closer to the terminal discharge state than the actual value (see, dashed arrow illustrated in FIG. 2(A)). As a result, the inventors of the present invention found that an error in remaining battery capacity occurs as much as the length of the arrow illustrated in FIG. 2(A).

With that in mind, the inventors carried out a study in order to solve the aforementioned problem for a non-aqueous electrolyte secondary battery having the internal resistance of 10 mΩ/Ah or less (SOC of 50%), in which the battery is supposed to be used under high output conditions. Herein, the internal resistance of a battery is one indicator representing the input and output performance. In particular, it is preferable for a large-sized secondary battery used for an automobile or the like to have an internal resistance value as low as possible within a designable region. Regarding this point, as a battery which is supposed to be used under the high output conditions, the inventors determined that a non-aqueous electrolyte secondary battery to be a subject of the present invention is the non-aqueous electrolyte secondary battery having the internal resistance of 10 mΩ/Ah (SOC of 50%) or less and carried out a study.

As a result, when the mixing ratio of the lithium nickel-based composite oxide is set in the range of 50 to 70% by weight relative to 100% by weight of the positive electrode active substance, the error in remaining battery capacity as described above can be reduced, and the present invention is completed accordingly.

Namely, the non-aqueous electrolyte secondary battery according to this embodiment is characterized in that the mixing ratio of the lithium nickel-based composite oxide is 50 to 70% by weight relative to the total 100% by weight of the spinel type lithium manganese composite oxide and the lithium nickel-based composite oxide.

Figure 2B:
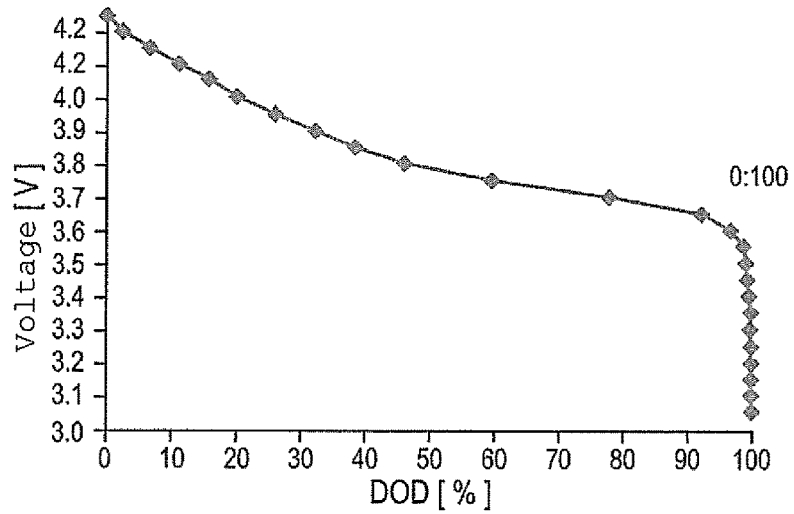
FIG. 2(B) is a graph illustrating the discharge curve of the lithium nickel-based composite oxide ($LiNi_{0.5}Mn_{0.3}Co_{0.2}O_2$).
Figure 2C:
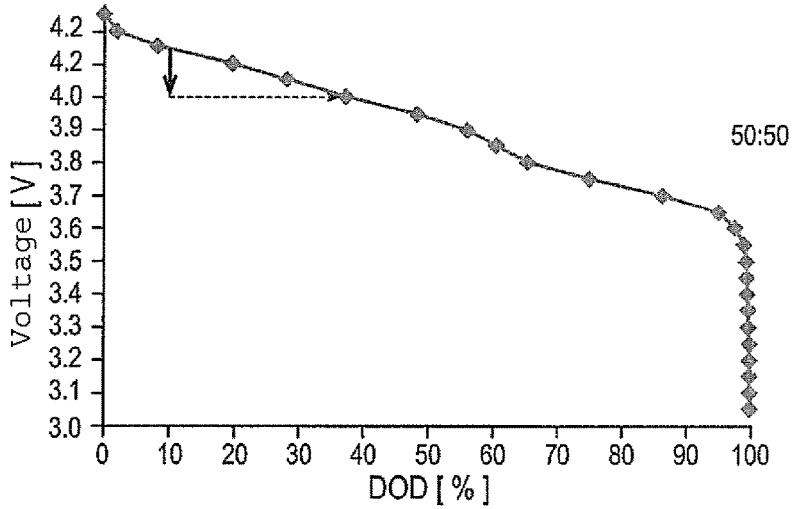
FIG. 2(C) is a graph illustrating the discharge curve of a positive electrode active substance in which the spinel type lithium manganese composite oxide and $LiNi_{0.5}Mn_{0.3}Co_{0.2}O_2$ are admixed at the same weight.

Herein, the mechanism for having a reduced error in remaining battery capacity by having the aforementioned characteristics is believed to be as follows. Namely, as described above with reference to FIG. 2(A), for the spinel type lithium manganese composite oxide, the absolute value of slope in the discharge curve is small for most region with DOD of 20 to 80%, which is a common application range of a battery installed in a vehicle (the discharge curve is smooth in that region). On the other hand, for the lithium nickel-based composite oxide, the absolute value of slope in the discharge curve is relatively large for the region with DOD of 20 to 80%, as illustrated in FIG. 2(B), and only a small plateau region exists at the terminal stage of discharge (FIG. 2(B) is a graph illustrating the discharge curve of $LiNi_{0.5}Mn_{0.3}Co_{0.2}O_2$). FIG. 2(C) is a graph illustrating the discharge curve of a positive electrode active substance in which the spinel type lithium manganese composite oxide and $LiNi_{0.5}Mn_{0.3}Co_{0.2}O_2$ are admixed at the same weight. According to the positive electrode active substance in the mixed state with the aforementioned mixing ratio, even when a temporary drop in cell voltage occurs in the same amount as FIG. 2(A), the DOD corresponding to that (dropped) cell voltage in the discharge curve does not shift at the same level as FIG. 2(A) to the terminal discharge state. Rather, it stays at a value that is closer to a real value (the dashed arrow illustrated in FIG. 2(C)). Thus, according to the non-aqueous electrolyte secondary battery of this embodiment, the calculated error in remaining battery capacity is reduced even when the cell voltage is temporarily dropped as caused by high output (high current) load.

Meanwhile, the mixing ratio of the lithium nickel-based composite oxide is preferably 60 to 70% by weight relative to the total 100% by weight of the spinel type lithium manganese composite oxide and the lithium nickel-based composite oxide, and more preferably 65 to 70% by weight. Meanwhile, the mixing ratio of the spinel type lithium manganese composite oxide is, although not particularly limited, preferably 30 to 40% by weight relative to the total 100% by weight of the spinel type lithium manganese composite oxide and the lithium nickel-based composite oxide, and more preferably, 30 to 35% by weight.

Other Components

If necessary, the positive electrode active substance layer further contains, in addition to the aforementioned positive electrode active substance, other additives such as a conductive aid, a binder, an electrolyte (for example, polymer matrix, ion conductive polymer, and electrolyte solution), and lithium salt for enhancing ion conductivity. However, the content of a material capable of functioning as an active substance in the positive electrode active substance layer and the negative electrode active substance layer described below is preferably 85 to 99.5% by weight.

(Binder)

A binder used for the positive electrode active substance layer is not particularly limited and the following materials can be mentioned; thermoplastic polymers such as polyethylene, polypropylene, polyethylene terephthalate (PET), polyether nitrile, polyacrylonitrile, polyimide, polyamide, cellulose, carboxymethyl cellulose (CMC) and a salt thereof, an ethylene-vinyl acetate copolymer, polyvinylidene chloride, styrene-butadiene rubber (SBR), isoprene rubber, butadiene rubber, ethylene-propylene rubber, an ethylene-propylene-diene copolymer, a styrene-butadiene-styrene block copolymer and a hydrogen-added product thereof, and a styrene-isoprene-styrene block copolymer and a hydrogen-added product thereof, fluorine resins such as polyvinylidene fluoride (PVdF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF), vinylidene fluoride-based fluorine rubber such as vinylidene fluoride-hexafluoropropylene-based fluorine rubber (VDF-HFP-based fluorine rubber), vinylidene fluoride-hexafluoropropylene-tetrafluoroethylene-based fluorine rubber (VDF-HFP-TFE-based fluorine rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFP-TFE-based fluorine rubber), vinylidene fluoride-perfluoromethyl vinyl ether-tetrafluoroethylene-based rubber (VDF-PFMVE-TFE-based fluorine rubber), and vinylidene fluoride-chlorotrifluoroethylene-based fluorine rubber (VDF-CTFE-based fluorine rubber), an epoxy resin, and the like. These binders may be each used singly, or two or more thereof may be used in combination.

The amount of the binder contained in the positive electrode active substance layer is not particularly limited as long as the binder can bind the active substance. The amount of binder is preferably 0.5 to 15% by weight, more preferably 1 to 10% by weight with respect to the active substance layer.

If necessary, the positive electrode active substance layer further contains other additives such as a conductive aid, an electrolyte (for example, polymer matrix, ion conductive polymer, and electrolyte solution), and lithium salt for enhancing ion conductivity.

The conductive aid means an additive which is blended in order to enhance the conductivity of the positive electrode active substance layer or negative electrode active substance layer. Examples of the conductive aid include carbon materials such as carbon black including ketjen black and acetylene black; graphite; and carbon fiber. When the active substance layer contains a conductive aid, an electron network in the inside of the active substance layer is formed effectively, and it can contribute to improvement of the output characteristics of a battery.

Examples of the electrolyte salt (lithium salt) include $Li(C_2F_5SO_2)_2N$, $LiPF_6$, $LiBF_4$, $LiClO_4$, $LiAsF_6$, and $LiCF_3SO_3$.

Examples of the ion conductive polymer include polyethylene oxide (PEO)-based and polypropylene oxide (PPO)-based polymer.

A blending ratio of the components that are contained in the positive electrode active substance layer and negative electrode active substance layer described below is not particularly limited. The blending ratio can be adjusted by suitably referring to the already-known knowledge about a lithium ion secondary battery. The thickness of each active substance layer is not particularly limited either, and reference can be made to the already-known knowledge about a battery. For example, the thickness of each active substance layer is about 2 to 100 µm.

[Negative Electrode Active Substance Layer]

The negative electrode active substance layer contains an active substance, and if necessary, further contains other additives such as a conductive aid, a binder, an electrolyte (for example, polymer matrix, ion conductive polymer, and electrolyte solution), and lithium salt for enhancing ion conductivity. The other additives such as a conductive aid, a binder, an electrolyte (for example, polymer matrix, ion conductive polymer, and electrolyte solution), and lithium salt for enhancing ion conductivity are the same as those described above for the positive electrode active substance layer.

Examples of the negative electrode active substance include a carbon material such as graphite, soft carbon, and hard carbon, a lithium-transition metal composite oxide (for example, $Li_4Ti_5O_{12}$), a metal material, and a lithium alloy-based negative electrode material. If necessary, two or more kinds of a negative electrode active substance may be used in combination. Preferably, from the viewpoint of capacity and output characteristics, a carbon material or a lithium-transition metal composite oxide is used as a negative electrode active substance. Meanwhile, it is needless to say that a negative electrode active substance other than those described above can be also used.

The average particle diameter of a negative electrode active substance is, although not particularly limited, preferably 1 to 100 µm, and more preferably 1 to 20 µm from the viewpoint of having high output.

The negative electrode active substance layer preferably contains at least an aqueous binder. The aqueous binder has a high binding property. Further, since water as a raw material is easily available and also only water vapor is generated during drying, there is an advantage that the investment on facilities of a production line can be greatly reduced and an environmental load can be reduced.

The aqueous binder indicates a binder which has water as a solvent or a dispersion medium, and specific examples thereof include a thermoplastic resin, a polymer with rubber elasticity, a water soluble polymer, and a mixture thereof. Herein, the binder which has water as a dispersion medium includes all expressed as latex or an emulsion, and it indicates a polymer emulsified in water or suspended in water. Examples thereof include a polymer latex obtained by emulsion polymerization in a self-emulsifying system.

Specific examples of the aqueous binder include a styrene polymer (styrene-butadiene rubber, styrene-vinyl acetic acid copolymer, styrene-acryl copolymer or the like), acrylonitrile-butadiene rubber, methacrylic acid methyl-butadiene rubber, (meth)acrylic polymer (polyethylacrylate, polyethylmethacrylate, polypropylacrylate, polymethylmethacrylate (methacrylic acid methyl rubber), polypropylmethacrylate, polyisopropylacrylate, polyisopropylmethacrylate, polybutylacrylate, polybutylmethacrylate, polyhexylacrylate, polyhexylmethacrylate, polyethylhexylacrylate, polyethylhexylmethacrylate, polylaurylacrylate, polylaurylmethacrylate, or the like), polytetrafluoroethylene, polyethylene, polypropylene, an ethylene-propylene copolymer, polybutadiene, butyl rubber, fluororubber, polyethylene oxide, polyepichlorohydrin, polyphosphagen, polyacrylonitrile, polystyrene, an ethylene-propylene-diene copolymer, polyvinylpyridine, chlorosulfonated polyethylene, a polyester resin, a phenol resin, an epoxy resin; polyvinyl alcohol (average polymerization degree is preferably 200 to 4000, and more preferably 1000 to 3000, and saponification degree is preferably 80% by mol or more, and more preferably 90% by mol or more) and a modified product thereof (1 to 80% by mol saponified product in a vinyl acetate unit of a copolymer with ethylene/vinyl acetate=2/98 to 30/70 (molar ratio), 1 to 50% by mol partially acetalized product of polyvinyl alcohol, or the like), starch and a modified product (oxidized starch, phosphoric acid esterified starch, cationized starch, or the like), cellulose derivatives (carboxymethyl cellulose, methyl cellulose, hydroxypropyl cellulose, hydroxyethyl cellulose, or a salt thereof, or the like), polyvinylpyrrolidone, polyacrylic acid (salt), polyethylene gylcol, a copolymer of (meth)acrylamide and/or (meth)acrylic acid salt [(meth)acrylamide polymer, (meth)acrylamide-(meth) acrylic acid salt copolymer, alkyl (meth) acrylic acid (carbon atom number of 1 to 4) ester-(meth) acrylic acid salt copolymer, or the like], a styrene-maleic acid salt copolymer, a mannich modified product of polyacrylamide, a formalin condensation type resin (urea-formalin resin, melamin-formalin resin or the like), a polyamidepolyamine or dialkylamine-epichlorohydrin copolymer, polyethyleneimine, casein, soybean protein, synthetic protein, and a water soluble polymer such as galactomannan derivatives. The aqueous binder can be used either singly or in combination of two or more types.

From the viewpoint of a binding property, the aqueous binder preferably contains at least one rubber-based binder selected from the group consisting of styrene-butadiene rubber, acrylonitrile-butadiene rubber, methacrylic acid methyl-butadiene rubber, and methacrylic acid methyl rubber. Further, from the viewpoint of having a good binding property, the aqueous binder preferably contains styrene-butadiene rubber.

When styrene-butadiene rubber is used as an aqueous binder, the aforementioned water soluble polymer is preferably used in combination from the viewpoint of improving the coating property. Examples of the water soluble polymer which is preferably used in combination with styrene-butadiene rubber include polyvinyl alcohol and a modified product thereof, starch and a modified product thereof, cellulose derivatives (carboxymethyl cellulose, methyl cellulose, hydroxyethyl cellulose, or a salt thereof, or the like), polyvinylpyrrolidone, polyacrylic acid (salt), and polyethylene glycol. Among them, styrene-butadiene rubber and carboxymethyl cellulose (salt) are preferably combined as a binder. The weight content ratio between styrene-butadiene rubber and a water soluble polymer is, although not particularly limited, preferably as follows: styrene-butadiene rubber:water soluble polymer=1:0.1 to 10, and more preferably 1:0.5 to 2.

In a binder used for the negative electrode active substance layer, the content of the aqueous binder is preferably 80 to 100% by weight, preferably 90 to 100% by weight, and preferably 100% by weight.

Meanwhile, the weight (single surface coating amount) per unit area of the negative electrode active substance layer is, although not particularly limited, preferably 7.4 to 9.2 mg/cm$^2$, and more preferably 7.8 to 8.3 mg/cm$^2$ from the viewpoint of sufficiently exhibiting the effect of the present invention.

[Separator (Electrolyte Layer)]

A separator has a function of maintaining an electrolyte to ensure lithium ion conductivity between a positive electrode and a negative electrode and also a function of a partition wall between a positive electrode and a negative electrode. Examples of a separator shape include a porous sheet separator or a non-woven fabric separator composed of a polymer or a fiber which absorbs and maintains the electrolyte.

As a porous sheet separator composed of a polymer or a fiber, a microporous (microporous membrane) separator can be used, for example. Specific examples of the porous sheet composed of a polymer or a fiber include a microporous (microporous membrane) separator which is composed of polyolefin such as polyethylene (PE) and polypropylene (PP); a laminate in which plural of them are laminated (for example, a laminate with three-layer structure of PP/PE/PP), and a hydrocarbon based resin such as polyimide, aramid, or polyfluorovinylydene-hexafluoropropylene (PVdF-HFP), or glass fiber.

The thickness of the microporous (microporous membrane) separator cannot be uniformly defined as it varies depending on use of application. For example, for an application in a secondary battery for operating a motor of an electric vehicle (EV), a hybrid electric vehicle (HEV), a fuel cell vehicle (FCV) or the like, it is preferably 4 to 60 μm as a monolayer or a multilayer. Fine pore diameter of the microporous (microporous membrane) separator is preferably 1 μm or less at most (in general, the pore diameter is about several tens of nanometers).

As a non-woven fabric separator, conventionally known ones such as cotton, rayon, acetate, nylon, polyester; polyolefin such as PP and PE; polyimide and aramid are used either singly or as a mixture. Furthermore, the bulk density of a non-woven fabric is not particularly limited as long as sufficient battery characteristics are obtained with an impregnated polymer gel electrolyte. Furthermore, it is sufficient that the thickness of the non-woven fabric separator is the same as that of an electrolyte layer. Preferably, it is 5 to 200 μm. Particularly preferably, it is 10 to 100 μm.

As described above, the separator also contains an electrolyte. The electrolyte is not particularly limited if it can exhibit those functions, and a liquid electrolyte or a gel polymer electrolyte is used. By using a gel polymer electrolyte, a distance between electrodes is stabilized and an occurrence of polarization is suppressed so that the durability (cycle characteristics) is improved.

The liquid electrolyte has an activity of a lithium ion carrier. The liquid electrolyte constituting an electrolyte solution layer has the form in which lithium salt as a supporting salt is dissolved in an organic solvent as a plasticizer. Examples of the organic solvent which can be used include carbonates such as ethylene carbonate (EC), propylene carbonate (PC), dimethyl carbonate (DMC), diethyl carbonate (DEC), and ethylmethyl carbonate. Furthermore, as a lithium salt, the compound which can be added to an active substance layer of an electrode such as $Li(CF_3SO_2)_2N$, $Li(C_2F_5SO_2)_2N$, $LiPF_6$, $LiBF_4$, $LiClO_4$, $LiAsF_6$, $LiTaF_6$, and $LiCF_3SO_3$ can be similarly used. The liquid electrolyte may further contain an additive in addition to the components that are described above. Specific examples of the compound include vinylene carbonate, methylvinylene carbonate, dimethylvinylene carbonate, phenylvinylene carbonate, diphenylvinylene carbonate, ethylvinylene carbonate, diethylvinylene carbonate, vinylethylene carbonate, 1,2-divinylethylene carbonate, 1-methyl-1-vinylethylene carbonate, 1-methyl-2-vinylethylene carbonate, 1-ethyl-1-vinylethylene carbonate, 1-ethyl-2-vinylethylene carbonate, vinylvinylene carbonate, allylethylene carbonate, vinyloxymethylethylene carbonate, allyloxymethylethylene carbonate, acryloxymethylethylene carbonate, methacryloxymethylethylene carbonate, ethynylethylene carbonate, propargylethylene carbonate, ethynyloxymethylethylene carbonate, propargyloxyethylene carbonate, methylene ethylene carbonate, and 1,1-dimethyl-2-methyleneethylene carbonate. Among them, vinylene carbonate, methylvinylene carbonate, and vinylethylene carbonate are preferable. Vinylene carbonate and vinylethylene carbonate are more preferable. Those cyclic carbonate esters may be used either singly or in combination of two or more types.

The gel polymer electrolyte has a constitution that the aforementioned liquid electrolyte is injected to a matrix polymer (host polymer) consisting of an ion conductive polymer. Using a gel polymer electrolyte as an electrolyte is excellent in that the fluidity of an electrolyte disappears and ion conductivity between layers is blocked. Examples of an ion conductive polymer which is used as a matrix polymer (host polymer) include polyethylene oxide (PEO), polypropylene oxide (PPO), polyethylene glycol (PEG), polyacrylonitrile (PAN), polyvinylidene fluoride-hexafluoropropylene (PVdF-HEP), poly(methyl methacrylate (PMMA) and a copolymer thereof.

According to forming of a cross-linked structure, the matrix polymer of a gel electrolyte can exhibit excellent mechanical strength. For forming a cross-linked structure, it is sufficient to perform a polymerization treatment of a polymerizable polymer for forming a polymer electrolyte (for example, PEO and PPO), such as thermal polymerization, UV polymerization, radiation polymerization, and electron beam polymerization, by using a suitable polymerization initiator.

Furthermore, as a separator, a separator with a heat resistant insulating layer laminated on a porous substrate (a separator having a heat resistant insulating layer) is preferable. The heat resistant insulating layer is a ceramic layer containing inorganic particles and a binder. As for the separator having a heat resistant insulating layer, those having high heat resistance, that is, melting point or heat softening point of 150° C. or higher, preferably 200° C. or higher, are used. By having a heat resistant insulating layer, internal stress in a separator which increases under temperature increase is alleviated so that the effect of inhibiting thermal shrinkage can be obtained. As a result, an occurrence of a short between electrodes of a battery can be prevented so that a battery configuration not easily allowing a performance reduction as caused by temperature increase is yielded. Furthermore, by having a heat resistant insulating layer, mechanical strength of a separator having a heat resistant insulating layer is improved so that the separator hardly has a film breaking. Furthermore, because of the effect of inhibiting thermal shrinkage and a high level of mechanical strength, the separator is hardly curled during the process of fabricating a battery.

The inorganic particles in a heat resistant insulating layer contribute to the mechanical strength or the effect of inhibiting thermal shrinkage of a heat resistant insulating layer. The material used as inorganic particles is not particularly limited. Examples thereof include oxides ($SiO_2$, $Al_2O_3$, $ZrO_2$, $TiO_2$), hydroxides and nitrides of silicon, aluminum, zirconium and titanium, and a composite thereof. The inorganic particles may be derived from mineral resources such as boehmite, zeolite, apatite, kaolin, mullite, spinel, olivine, and mica, or artificially synthesized. Furthermore, the inorganic particles may be used either singly or in combination of two or more types. From the viewpoint of the cost, it is preferable to use silica ($SiO_2$) or alumina ($Al_2O_3$) among them. It is more preferable to use alumina ($Al_2O_3$).

The weight per unit area of heat resistant particles is, although not particularly limited, preferably 5 to 15 $g/m^2$. When it is within this range, sufficient ion conductivity is obtained and heat resistant strength is maintained, and thus desirable.

The binder in a heat resistant insulating layer has a role of adhering inorganic particles or adhering inorganic particles to a porous resin substrate layer. With this binder, the heat resistant insulating layer is stably formed and peeling between a porous substrate layer and a heat resistant insulating layer is prevented.

The binder used for a heat resistant insulating layer is not particularly limited, and examples thereof which can be used include a compound such as carboxymethyl cellulose (CMC), polyacrylonitrile, cellulose, an ethylene-vinyl acetate copolymer, polyvinyl chloride, styrene-butadiene rubber (SBR), isoprene rubber, butadiene rubber, polyvinylidene fluoride (PVDF), polytetrafluoroethylene (PTFE), polyvinyl fluoride (PVF), and methyl acrylate. Among them, carboxymethyl cellulose (CMC), methyl acrylate, or polyvinylidene fluoride (PVDF) is preferably used. Those compounds may be used either singly or in combination of two or more types.

The content of the binder in a heat resistant insulating layer is preferably 2 to 20% by weight relative to 100% by weight of the heat resistant insulating layer. When the binder content is 2% by weight or more, the peeling strength between the heat resistant insulating layer and a porous substrate layer can be increased and vibration resistance of a separator can be enhanced. Meanwhile, when the binder content is 20% by weight or less, a gap between inorganic particles is maintained at an appropriate level so that sufficient lithium ion conductivity can be ensured.

Regarding the thermal shrinkage rate of a separator having a heat resistant insulating layer, both MD and TD are 10% or less after maintaining for 1 hour at conditions of 150° C., 2 $gf/cm^2$. By using a material with such high heat resistance, shrinkage of a separator can be effectively prevented even when the internal temperature of a battery reaches 150° C. due to increased heat generation amount from a positive electrode. As a result, an occurrence of a short between electrodes of a battery can be prevented, and thus a battery configuration not easily allowing performance reduction due to temperature increase is yielded.

[Positive Electrode Current Collecting Plate and Negative Electrode Current Collecting Plate]

The material for forming the current collecting plate (25, 27) is not particularly limited, and a known highly conductive material which has been conventionally used for a current collecting plate for a lithium ion secondary battery can be used. Preferred examples of the material for forming a current collecting plate include metal materials such as aluminum, copper, titanium, nickel, stainless steel (SUS) and an alloy thereof. From the viewpoint of light weightiness, resistance to corrosion, and high conductivity, aluminum and copper are preferable. Aluminum is particularly preferable. Meanwhile, the same material or a different material can be used for the positive electrode current collecting plate 27 and the negative electrode current collecting plate 25.

[Positive Electrode Lead and Negative Electrode Lead]

Further, although it is not illustrated, the current collector 11 and the current collecting plate (25, 27) can be electrically connected to each other via a positive electrode lead or a negative electrode lead. The same material used for a lithium ion secondary battery of a related art can be also used as a material for forming a positive electrode lead and a negative electrode lead. Meanwhile, a portion led from an outer casing is preferably coated with a heat resistant and insulating thermally shrunken tube or the like so that it has no influence on a product (for example, an automobile component, in particular, an electronic device or the like) according to electric leak after contact with neighboring instruments or wirings.

[Battery Outer Casing Body]

As for the battery outer casing body 29, an envelope-shaped casing to cover a power generating element, in which a laminate film including aluminum is contained, can be used in addition to a known metal can casing. As for the laminate film, a laminate film with a three-layer structure formed by laminating PP, aluminum and nylon in order can be used, but not limited thereto. From the viewpoint of having high output and excellent cooling performance, and of being suitably usable for a battery for a large instrument such as EV or HEV, a laminate film is preferable. Furthermore, as the group pressure applied from outside to a power generating element can be easily controlled and thus the thickness of an electrolyte solution layer can be easily controlled to a desired value, a laminate film consisting aluminate is more preferred for an outer casing body.

[Cell Size]

Figure 3:
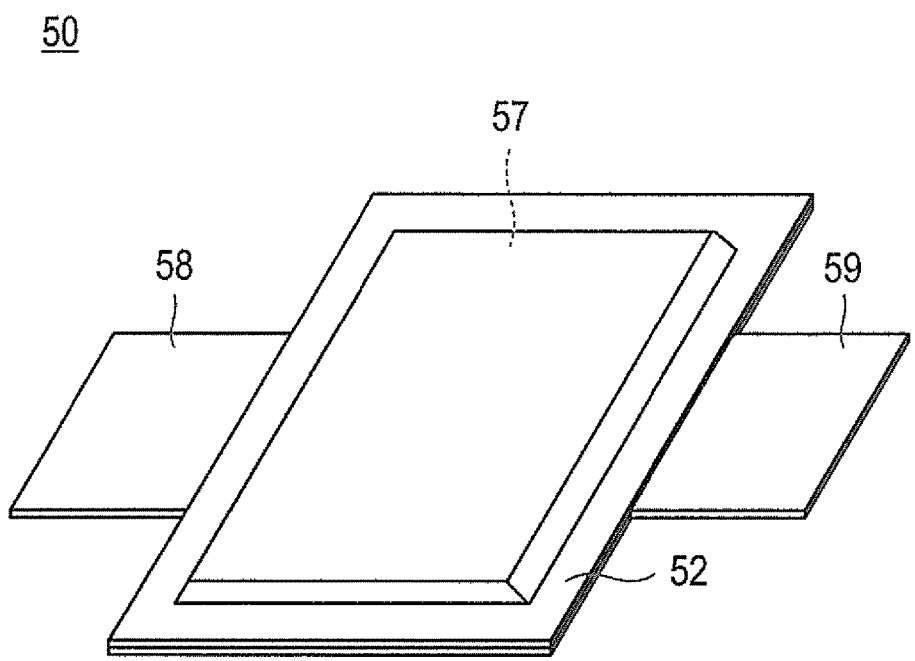
FIG. 3 is a perspective view illustrating the appearance of a flat lithium ion secondary battery as a representative embodiment of a non-aqueous electrolyte secondary battery.

FIG. 3 is a perspective view illustrating the appearance of a flat lithium ion secondary battery as a representative embodiment of a secondary battery. According to a preferred embodiment of the present invention, like this secondary battery, a flat stack type laminate battery having a constitution that the power generating element is enclosed in a battery outer casing body which is formed of a laminate film containing aluminum is provided.

As illustrated in FIG. 3, the flat lithium ion secondary battery 50 has a flat and rectangular shape, and from both sides, the positive electrode tab 58 and the negative electrode tab 59 are drawn to extract electric power. The power generating element 57 is covered by the battery outer casing material 52 of the lithium ion secondary battery 50 with its periphery fused by heat. The power generating element 57 is sealed in a state in which the positive electrode tab 58 and the negative electrode tab 59 are led to the outside. Herein, the power generating element 57 corresponds to the power generating element 21 of the lithium ion secondary battery 10 illustrated in FIG. 1 as described above. In the power generating element 57, plural single battery layers (single cell) 19, which are each formed of the positive electrode (positive electrode active substance layer) 15, the electrolyte layer 17 and the negative electrode (negative electrode active substance layer) 13, are laminated.

Meanwhile, the lithium ion secondary battery is not limited to a flat shape of laminate type. The winding type lithium ion secondary battery may have a barrel shape or a flat and rectangular shape obtained by modifying the barrel shape, and it is not particularly limited. As an outer casing material of the barrel shape, a laminate film can be used, and a barrel can (metal can) of a related art can be used, and thus it is not particularly limited. Preferably, the power generating element is encased with an aluminum laminate film. Weight reduction can be achieved with such shape.

Furthermore, drawing of the tabs 58 and 59 illustrated in FIG. 3 is not particularly limited, either. The positive electrode tab 58 and the negative electrode tab 59 may be drawn from the same side or each of the positive electrode tab 58 and negative electrode tab 59 may be divided into plural tabs and drawn from each side, and thus it is not limited to the embodiment illustrated in FIG. 3. Furthermore, in a winding type lithium ion battery, it is also possible to form a terminal by using, for example, a barrel can (metal can) instead of a tab.

A typical electric vehicle has a battery storage space of about 170 L. Since a cell and an auxiliary machine such as a device for controlling charge and discharge are stored in this space, storage space efficiency of a cell is about 50% in general. The cell loading efficiency for this space is a factor of determining the cruising distance of an electric vehicle. As the size of a single cell decreases, the loading efficiency is lowered, and thus it becomes impossible to maintain the cruising distance.

Thus, in the present invention, the battery structure of which power generating element is covered with an outer casing body preferably has a large size. Specifically, length of short side of a laminate cell battery is preferably 100 mm or more. Such large-size battery can be used for an automobile. Herein, the length of short side of a laminate cell battery indicates the length of a shortest side. The upper limit of a length of a short side is, although not particularly limited, generally 400 mm or less.

[Volume Energy Density and Rated Discharge Capacity]

According to the market requirement, a typical electric vehicle needs to have driving distance (cruising distance) of 100 km or more per single charge. Considering such cruising distance, the volume energy density of a battery is preferably 157 Wh/L or more and the rated capacity is preferably 20 Wh or more.

Herein, with regard to the non-aqueous electrolyte secondary battery in which the positive electrode of this embodiment is used, largeness of a battery is determined in view of a relationship between battery area or battery capacity, from the viewpoint of a large-sized battery, which is different from a physical size of an electrode. Specifically, the non-aqueous electrolyte secondary battery of this embodiment is a flat stack type laminate battery, in which the ratio value of a battery area (projected area of a battery including a battery outer casing body) to rated capacity is 5 $cm^2$/Ah or more, and the rated capacity is 3 Ah or more. Thus, with a battery with large area and large capacity, the problem of an error in displaying remaining battery capacity can be more significant at the time of applying high output load as described above. Meanwhile, in a conventional battery for everyday household use, which has no large area or large capacity, such a problem is hardly actualized.

Furthermore, the aspect ratio of a rectangular electrode is preferably 1 to 3, and more preferably 1 to 2. Meanwhile, the aspect ratio of an electrode is defined by longitudinal/transversal ratio of a positive electrode active substance layer with a rectangular shape. By having the aspect ratio in this range, an advantage of having both the performances required for a vehicle and loading space can be obtained.

[Assembled Battery]

An assembled battery is formed by connecting plural batteries. Specifically, at least two of them are used in series, in parallel, or in series and parallel. According to arrangement in series or parallel, it becomes possible to freely control the capacity and voltage.

It is also possible to form a detachable small-size assembled battery by connecting plural batteries in series or in parallel. Furthermore, by connecting again plural detachable small-size assembled batteries in series or parallel, an assembled battery having high capacity and high output, which is suitable for a power source or an auxiliary power source for operating a vehicle requiring high volume energy density and high volume output density, can be formed. The number of the connected batteries for fabricating an assembled battery or the number of the stacks of a small-size assembled battery for fabricating an assembled battery with high capacity can be determined depending on the capacity or output of a battery of a vehicle (electric vehicle) for which the battery is loaded.

[Vehicle]

The non-aqueous electrolyte secondary battery of the present invention can maintain discharge capacity even when it is used for a long period of time, and thus has good cycle characteristics. It also has high volume energy density. For use in a vehicle such as an electric vehicle, a hybrid electric vehicle, a fuel cell vehicle, or a hybrid fuel cell vehicle, long service life is required as well as high capacity and large size compared to use for an electric and mobile electronic device. As such, the non-aqueous electrolyte secondary battery can be preferably used as a power source for a vehicle, for example, as a power source for operating a vehicle or as an auxiliary power source for operating a vehicle.

Specifically, the battery or an assembled battery formed by combining plural batteries can be mounted on a vehicle. According to the present invention, a battery with excellent long term reliability, output characteristics, and long service life can be formed, and thus, by mounting this battery, a plug-in hybrid electric vehicle with long EV driving distance and an electric vehicle with long driving distance per charge can be achieved. That is because, when the battery or an assembled battery formed by combining plural batteries is used for, for example, a vehicle such as hybrid car, fuel cell car, and electric car (including two-wheel vehicle (motor bike) or three-wheel vehicle in addition to all four-wheel vehicles (automobile, truck, commercial vehicle such as bus, compact car, or the like)), a vehicle with long service life and high reliability can be provided. However, the use is not limited to a vehicle, and it can be applied to various power sources of other transportation means, for example, a moving object such as an electric train, and it can be also used as a power source for loading such as an uninterruptable power source device.

EXAMPLES

The present invention is described in more detail in view of Examples and Comparative Examples. However, it is evident that the technical scope of the present invention is not limited to the Examples given below.

(1-1) Preparation of Lithium Nickel-Based Composite Oxide (1)

To an aqueous solution (1 mol/L) having nickel sulfate, cobalt sulfate, and manganese sulfate dissolved therein, sodium hydroxide and ammonia were continuously supplied at 60° C. to adjust the pH to 11.3, and according to a co-precipitation method, metal composite hydroxide in which nickel, manganese, and cobalt were dissolved at molar ratio of 50:30:20 was produced.

The metal composite hydroxide and lithium carbonate were weighed such that the ratio of the total mole number of metals (Ni, Co and Mn) other than Li to the mole number of Li was 1:1, and then thoroughly mixed. The temperature was increased at temperature increase rate of 5° C./min, temporary calcination was performed at 900° C. for 2 hours in air atmosphere, the temperature was increased at temperature increase rate of 3° C./min, and then main calcination was performed at 920° C. for 10 hours. After cooling to room temperature, as a positive electrode active substance having a composition of $LiNi_{0.50}Mn_{0.30}Co_{0.20}O_2$, a NMC composite oxide (1) was obtained as a positive electrode active substance. Meanwhile, the average secondary particle diameter of the obtained NMC composite oxide (1) was 10 μm.

(1-2) Preparation of Lithium Nickel-Based Composite Oxide (2)

As a positive electrode active substance having a composition of $LiNi_{0.80}Mn_{0.10}Co_{0.10}O_2$, NMC composite oxide (2) was obtained in the same manner as the above (1-1) except that the molar ratio among nickel, manganese, and cobalt was set at 80:10:10. Meanwhile, the average secondary particle diameter of the obtained NMC composite oxide (2) was 9 μm.

(2) Preparation of Spinel Type Lithium Manganese Composite Oxide

As another positive electrode active substance, a spinel type lithium manganese composite oxide ($LiMn_2O_4$) was prepared. Meanwhile, the average secondary particle diameter of the spinel type lithium manganese composite oxide thus prepared was 10 μm.

(3) Production of Positive Electrode

90% by weight in total of any one of the NMC composite oxide (1), the NMC composite oxide (2) and the spinel type lithium manganese composite oxide as prepared above, 5% by weight of carbon black as a conductive aid (Super-P, manufactured by 3M Company), 5% by weight of polyvinylidene fluoride (PVDF) as a binder (#7200, manufactured by KUREHA CORPORATION), and a suitable amount of N-methyl-2-pyrrolidone (NMP) as a solvent for controlling slurry viscosity were admixed with one another to prepare a slurry of positive electrode active substance. Then, the obtained slurry of positive electrode active substance was coated on a surface of an aluminum foil (thickness: 20 μm) as a current collector, dried for 3 minutes at 120° C., subjected to press molding using a roll press machine to produce a positive electrode active substance layer of which planar shape is a rectangular shape. The positive electrode active substance layer was also formed on the back surface in the same manner as above. Accordingly, a positive electrode obtained by forming a positive electrode active substance layer on both surfaces of a positive electrode current collector (aluminum foil) was produced. Meanwhile, the coating amount on a single surface of positive electrode active substance layer was 17 mg/cm$^2$ (excluding the foil). According to this procedure, 16 kinds of positive electrodes with different composition of a positive electrode active substance were produced as described in the following Table 1 (numbers are present in % by weight). Furthermore, those positive electrodes were used after cutting them to have a length of 200 mm for the four sides.

TABLE 1

| Symbol of positive electrode | $LiMn_2O_4$ | NMC composite oxide (1) | NMC composite oxide (2) | Mixing ratio of NMC composite oxide (% by weight) | Conductive aid | Binder |
| --- | --- | --- | --- | --- | --- | --- |
| C1 | 90 | 0 | | 0 | 5 | 5 |
| C2 | 81 | 9 | | 10 | 5 | 5 |
| C3 | 72 | 18 | | 20 | 5 | 5 |
| C4 | 63 | 27 | | 30 | 5 | 5 |
| C5 | 54 | 36 | | 40 | 5 | 5 |
| C6 | 45 | 45 | | 50 | 5 | 5 |
| C7 | 36 | 54 | | 60 | 5 | 5 |
| C8 | 27 | 63 | | 70 | 5 | 5 |
| C9 | 18 | 72 | | 80 | 5 | 5 |
| C10 | 9 | 81 | | 90 | 5 | 5 |
| C11 | 0 | 90 | | 100 | 5 | 5 |
| C12 | 81 | | 9 | 10 | 5 | 5 |
| C13 | 63 | | 27 | 30 | 5 | 5 |
| C14 | 45 | | 45 | 50 | 5 | 5 |
| C15 | 27 | | 63 | 70 | 5 | 5 |
| C16 | 9 | | 81 | 90 | 5 | 5 |

(4) Production of Negative Electrode

Subsequently, 95% by weight of artificial graphite as a negative electrode active substance, 2% by weight of carbon black as a conductive aid (Super-P, manufactured by 3M Company), 1% by weight of ammonium salt of carboxy methyl cellulose and 2% by weight of styrene-butadiene copolymer latex as a binder were dispersed in purified water to produce a slurry of negative electrode active substance. Then, this slurry of negative electrode active substance was coated on a copper foil (thickness: 10 µm) to be a negative electrode current collector, dried for 3 minutes at 120° C., subjected to press molding using a roll press machine to produce a negative electrode. The same treatment was performed for the back surface to form a negative electrode active substance layer so that a negative electrode having a negative electrode active substance layer formed on both surfaces of a negative electrode current collector (copper foil) was produced. Meanwhile, the coating amount on the negative electrode active substance layer was adjusted such that the A/C ratio relative to the opposite positive electrode is 1.20 during the production of a test cell described below (accordingly, the coating amount on a single surface of negative electrode active substance layer is 5.2 to 10.3 mg/cm$^2$ (excluding the foil)). Furthermore, the negative electrode was used after cutting it to have a length of 202 mm for the four sides.

(5) Production of Test Cell

By alternately laminating, via the separator (thickness: 25 µm, Celgard #2500, manufactured by Polypore K.K.), a positive electrode prepared in above (3) and the negative electrode prepared in above (4) according to selection as shown in the following Table 2 (three layers of positive electrode and four layers of negative electrode), a power generating element was produced. The obtained power generating element was disposed within a bag made of aluminum laminate sheet as an outer casing, and an electrolyte solution was added thereto. As an electrolyte solution, a solution in which 1.0 M LiPF$_6$ was dissolved in a mixed solvent of ethylene carbonate (EC) and diethyl carbonate (DEC) (volume ratio of 3:7), in which 1% by weight of vinylene carbonate was added as an additive relative to 100% by weight of the solution, was used. Herein, the liquid injection amount of the electrolyte solution was set at an amount which is 1.40 times of the entire pore volume of the positive electrode active substance layer, negative electrode active substance layer, and separator (the pore volume was obtained by calculation). Subsequently, under vacuum conditions, the opening of an aluminum laminate sheet bag was sealed such that the tab for taking out current, which had been connected to both electrodes, was led to outside, and a test cell as a laminate type lithium ion secondary battery was completed. Accordingly, 16 kinds of test cells which have different kinds of a positive electrode were produced as shown in the following Table 2. Meanwhile, the internal resistance (DCR), the rated capacity (Ah) and the ratio of battery area to the rated capacity (cm$^2$/Ah) for the each obtained test cell are shown in the following Table 2.

As described herein, the rated capacity of a battery was obtained as described below.

<<Measurement of Rated Capacity>>

For measurement of rated capacity, a test cell was injected with an electrolyte solution, allowed to stand for 10 hours or so, and subjected to initial charge. After that, the measurement was carried out according to the following step 1 to 5 at temperature of 25° C., in the voltage range of 3.0 V to 4.15 V.

Step 1: After constant current charge at 0.2 C to reach 4.15 V, it was rested for 5 minutes.

Step 2: After Step 1, it was charged for 1.5 hours by constant voltage charge followed by resting for 5 minutes.

Step 3: After constant current discharge at 0.2 C to reach 3.0 V, it was discharged for 2 hours by constant voltage discharge followed by resting for 10 seconds.

Step 4: After constant current charge at 0.2 C to reach 4.15V, it was charged for 2.5 hours by constant voltage charge followed by resting for 10 seconds.

Step 5: After constant current discharge at 0.2 C to reach 3.0 V, it was discharged for 2 hours by constant voltage discharge followed by resting for 10 seconds.

Rated capacity: The discharge capacity (CCCV discharge capacity) from the constant current discharge to constant voltage discharge of Step 5 was used as rated capacity.

(6) Evaluation of Characteristics of Test Cell

<<Evaluation 1: Measurement of Drop Amount of OCV>>

The test cell which has been produced in above (5) was subjected to 10% charging with the rated capacity of 100% (charging at 0.2 C for 30 minutes). Subsequently, the cell was allowed to stand for 3 hours, and once the open circuit voltage (OCV; cell voltage) was stabilized, the cell voltage was read (=SOC of 10%). 10% charging was performed again, and after the cell was allowed to stand for 3 hours, the cell voltage was read (=SOC of 20%). This process was repeated, and then the open circuit voltage (cell voltage) at SOC of 0 to 100% is shown in the following Table 2. Furthermore, 50% charging was performed according to the above method, and once the open circuit voltage was stabilized, constant current discharging was performed at a rate of 2 C for 20 seconds. The result of cell resistance which is calculated from the voltage drop amount obtained therefrom is shown in the following Table 2 (DCR$_{50}$).

TABLE 2

| | Symbol of positive electrode | Weight per unit area of single surface of negative electrode (mg/cm$^2$) | DCR$_{50}$ (mΩ/Ah) | Rated capacity (Ah) | Battery area/Rated capacity (cm$^2$/Ah) | Cell voltage at each SOC (OCV) | | | | | | | | | | |
|---|---|---|---|---|---|---|---|---|---|---|---|---|---|---|---|---|
| | | | | | | 0% | 10% | 20% | 30% | 40% | 50% | 60% | 70% | 80% | 90% | 100% |
| Comparative Example 1 | C1 | 5.2 | 3.3 | 3.3 | 121 | 2.5 | 3.83 | 3.87 | 3.91 | 3.93 | 3.96 | 3.99 | 4.02 | 4.05 | 4.07 | 4.15 |
| Comparative Example 2 | C2 | 5.6 | 3.0 | 3.6 | 111 | 2.5 | 3.70 | 3.83 | 3.88 | 3.91 | 3.94 | 3.98 | 4.01 | 4.04 | 4.07 | 4.15 |
| Comparative Example 3 | C3 | 6.1 | 2.8 | 3.9 | 103 | 2.5 | 3.665 | 3.76 | 3.84 | 3.89 | 3.925 | 3.965 | 4.00 | 4.035 | 4.065 | 4.15 |

TABLE 2-continued

| | Symbol of positive electrode | Weight per unit area of single surface of negative electrode (mg/cm$^2$) | $DCR_{50}$ (mΩ/Ah) | Rated capacity (Ah) | Battery area/Rated capacity (cm$^2$/Ah) | Cell voltage at each SOC (OCV) | | | | | | | | | | |
|---|---|---|---|---|---|---|---|---|---|---|---|---|---|---|---|---|
| | | | | | | 0% | 10% | 20% | 30% | 40% | 50% | 60% | 70% | 80% | 90% | 100% |
| Comparative Example 4 | C4 | 6.5 | 2.6 | 4.1 | 96 | 2.5 | 3.63 | 3.69 | 3.81 | 3.87 | 3.91 | 3.95 | 3.99 | 4.03 | 4.06 | 4.15 |
| Comparative Example 5 | C5 | 7.0 | 2.4 | 4.4 | 90 | 2.5 | 3.615 | 3.67 | 3.75 | 3.82 | 3.885 | 3.93 | 3.975 | 4.025 | 4.06 | 4.15 |
| Example 1 | C6 | 7.4 | 2.3 | 4.7 | 85 | 2.5 | 3.60 | 3.65 | 3.70 | 3.77 | 3.86 | 3.91 | 3.96 | 4.02 | 4.06 | 4.15 |
| Example 2 | C7 | 7.8 | 2.1 | 5.0 | 80 | 2.5 | 3.595 | 3.64 | 3.68 | 3.74 | 3.82 | 3.885 | 3.94 | 4.005 | 4.055 | 4.15 |
| Example 3 | C8 | 8.3 | 2.0 | 5.3 | 76 | 2.5 | 3.59 | 3.63 | 3.66 | 3.71 | 3.78 | 3.86 | 3.92 | 3.99 | 4.05 | 4.15 |
| Comparative Example 6 | C9 | 8.7 | 1.9 | 5.6 | 72 | 2.5 | 3.585 | 3.625 | 3.655 | 3.695 | 3.75 | 3.825 | 3.895 | 3.97 | 4.045 | 4.15 |
| Comparative Example 7 | C10 | 9.2 | 1.8 | 5.8 | 69 | 2.5 | 3.58 | 3.62 | 3.65 | 3.68 | 3.72 | 3.79 | 3.87 | 3.95 | 4.04 | 4.15 |
| Comparative Example 8 | C11 | 9.6 | 1.7 | 6.1 | 65 | 2.5 | 3.58 | 3.61 | 3.64 | 3.67 | 3.71 | 3.76 | 3.84 | 3.92 | 4.03 | 4.15 |
| Comparative Example 9 | C12 | 5.8 | 2.9 | 3.7 | 109 | 2.5 | 3.68 | 3.83 | 3.87 | 3.91 | 3.94 | 3.97 | 4.00 | 4.04 | 4.07 | 4.15 |
| Comparative Example 10 | C13 | 6.9 | 2.4 | 4.4 | 91 | 2.5 | 3.63 | 3.70 | 3.80 | 3.86 | 3.91 | 3.95 | 3.98 | 4.02 | 4.06 | 4.15 |
| Example 4 | C14 | 8.1 | 2.1 | 5.1 | 78 | 2.5 | 3.61 | 3.64 | 3.69 | 3.77 | 3.85 | 3.91 | 3.96 | 4.00 | 4.06 | 4.15 |
| Example 5 | C15 | 9.2 | 1.8 | 5.8 | 68 | 2.5 | 3.59 | 3.63 | 3.66 | 3.71 | 3.78 | 3.86 | 3.92 | 3.99 | 4.05 | 4.15 |
| Comparative Example 11 | C16 | 10.3 | 1.6 | 6.6 | 61 | 2.5 | 3.58 | 3.62 | 3.65 | 3.66 | 3.72 | 3.79 | 3.87 | 3.93 | 4.02 | 4.15 |

As shown in Table 2, in any of Examples 1 to 5 according to the present invention, the drop amount of OCV at every 10% in a region from the SOC of 10% to SOC of 90% (difference in neighboring cell voltage (OCV) described in Table 2) is found to be 30 mV or less.

<<Evaluation 2: Measurement of Display Error of Remaining Battery Capacity Under Load of 1 C>>

The test cell which has been produced in above (5) was allowed to stand for 24 hours, and once the open circuit voltage (OCV) was stabilized, the cell was charged at a rate of 0.2 C until the cut-off voltage of 4.15 V. Subsequently, the cell was rested for 1 hour and then discharged at a rate of 0.2 C until OCV corresponding to any DOD of 10%, 30%, 50% and 70%. After that, the cell was discharged from each DOD state for 10 seconds at a rate of 1 C, and the remaining battery capacity after performing discharge at 0.2 C for 1 hour was read from the previously established OCV curve. The reading was designated as V1 (V1 corresponds to an estimated value). In addition, the battery was allowed to stand for 100 minutes from the end point of 0.2 C discharge for measurement of V1 (for 1 minute), and then the remaining battery capacity was determined based on voltage measurement. The measured value was designated as V2 (V2 corresponds to a measured value). By using V1 and V2 values that were obtained from above, calculation was made, that is, V3=V2−V1, which was designated as a display error of a remaining battery capacity. The results are shown in the following Table 3.

TABLE 3

| | V3 (Evaluation 2) | | | |
|---|---|---|---|---|
| | DOD 10% | DOD 30% | DOD 50% | DOD 70% |
| Comparative Example 1 | 10% | 13% | 10% | 9% |
| Comparative Example 2 | 9% | 11% | 10% | 4% |
| Comparative Example 3 | 9% | 2% | 3% | 4% |
| Comparative Example 4 | 2% | 2% | 3% | 1% |
| Comparative Example 5 | 1% | 2% | 1% | 2% |
| Example 1 | 2% | 2% | 2% | 1% |
| Example 2 | 1% | 2% | 1% | 2% |
| Example 3 | 2% | 2% | 2% | 1% |
| Comparative Example 6 | 1% | 2% | 1% | 2% |
| Comparative Example 7 | 2% | 2% | 2% | 1% |
| Comparative Example 8 | 1% | 2% | 1% | 2% |
| Comparative Example 9 | 10% | 7% | 7% | 8% |
| Comparative Example 10 | 3% | 2% | 2% | 2% |
| Example 4 | 2% | 3% | 2% | 2% |
| Example 5 | 2% | 2% | 2% | 2% |
| Comparative Example 11 | 2% | 2% | 1% | 2% |

As shown in Table 3, in any of Examples 1 to 5 according to the present invention, the display error of the remaining battery capacity was 3% or less under the load of 1 C for all points including DOD of 10%, 30%, 50% and 70%. Thus, it is found that accurate residual battery capacity is indeed displayed.

<<Evaluation 3: Measurement of Display Error of Remaining Battery Capacity Under Load of 2 C>>

The same test as the above Evaluation 2 was performed except that the load of 1 C (10 seconds) for each DOD state was changed to the load of 2 C (for 20 seconds). The results are shown in the following Table 4.

TABLE 4

| | V3 (Evaluation 3) | | | |
|---|---|---|---|---|
| | DOD 10% | DOD 30% | DOD 50% | DOD 70% |
| Comparative Example 1 | 13% | 14% | 11% | 10% |
| Comparative Example 2 | 10% | 12% | 11% | 10% |
| Comparative Example 3 | 8% | 8% | 7% | 7% |
| Comparative Example 4 | 4% | 4% | 4% | 5% |
| Comparative Example 5 | 5% | 4% | 4% | 4% |
| Example 1 | 2% | 2% | 2% | 3% |
| Example 2 | 2% | 2% | 2% | 2% |
| Example 3 | 2% | 3% | 2% | 2% |
| Comparative Example 6 | 4% | 4% | 5% | 5% |
| Comparative Example 7 | 4% | 4% | 4% | 5% |
| Comparative Example 8 | 4% | 4% | 5% | 6% |
| Comparative Example 9 | 10% | 8% | 8% | 8% |
| Comparative Example 10 | 5% | 4% | 4% | 4% |
| Example 4 | 3% | 3% | 2% | 3% |
| Example 5 | 3% | 3% | 3% | 3% |
| Comparative Example 11 | 4% | 5% | 6% | 5% |

As shown in Table 4, in any of Examples 1 to 5 according to the present invention, the display error of the remaining battery capacity was 3% or less even under the load of 2 C for all points including DOD of 10%, 30%, 50% and 70%. Thus, it is found that accurate residual battery capacity is indeed displayed even under more severe temporary fluctuation in the load.

The invention claimed is:

1. A non-aqueous electrolyte secondary battery comprising a power generating element containing:
a positive electrode obtained by forming, on the surface of a positive electrode current collector, a positive electrode active substance layer containing a positive electrode active sub stance;
a negative electrode obtained by forming, on the surface of a negative electrode current collector, a negative electrode active substance layer containing a negative electrode active substance; and
a separator,
wherein the positive electrode active substance contains a spinel type lithium manganese composite oxide and a lithium nickel-based composite oxide, the mixing ratio of the lithium nickel-based composite oxide is 50 to 70% by weight relative to the total 100% by weight of the spinel type lithium manganese composite oxide and the lithium nickel-based composite oxide, the ratio of the total amount of the spinel type lithium manganese composite oxide and the lithium nickel-based composite oxide in 100% by weight of whole amount of the positive electrode active substance contained in the positive electrode active substance layer is 50% by weight or more,
and wherein the internal resistance of the non-aqueous electrolyte secondary battery is 10 mΩ/A·h or less (SOC of 50%), the ratio value of a battery area (projected area of a battery including a battery outer casing) to a rated capacity is 5 $cm^2$/Ah or more and the rated capacity is 3 Ah or more.

2. The non-aqueous electrolyte secondary battery according to claim 1, wherein
the lithium nickel-based composite oxide has a composition represented by General Formula: $Li_aNi_bM_cCo_dO_2$ (with the proviso that, in the formula, a, b, c, and d satisfy $0.9 \leq a \leq 1.2$, $0<b<1$, $0<c\leq 0.5$, $0<d\leq 0.5$, and $b+c+d=1$. M represents at least one selected from the group consisting of Mn, Ti, Zr, Nb, W, P, Al, Mg, V, Ca, Sr, and Cr).

3. The non-aqueous electrolyte secondary battery according to claim 2, wherein b, c and d are as follows: $0.44 \leq b \leq 0.51$, $0.27 \leq c \leq 0.31$, and $0.19 \leq d \leq 0.26$.

4. The non-aqueous electrolyte secondary battery according to claim 1, wherein the weight (single surface coating amount) per unit area of the negative electrode active substance layer is 7.4 to 9.2 mg/$cm^2$.

5. The non-aqueous electrolyte secondary battery according to claim 1, wherein the separator is a separator having a heat resistant insulating layer.

6. The non-aqueous electrolyte secondary battery according to claim 1, wherein the aspect ratio of an electrode defined as a longitudinal/transversal ratio of a rectangular positive electrode active substance layer is 1 to 3.

7. The non-aqueous electrolyte secondary battery according to claim 1, wherein the power generating element having the positive electrode, the negative electrode, and the separator, which is interposed between the positive electrode and the negative electrode for supporting a liquid electrolyte or a gel electrolyte, is encased inside an outer casing as a laminate film containing aluminum.

8. The non-aqueous electrolyte secondary battery according to claim 1, wherein the spinel type lithium manganese composite oxide is $LiMn_2O_4$.

* * * * *